F. H. HENRY.
WEAR STRIP AND RETAINER FOR SECURING COVERINGS TO THE FRAMES OF CAR SEATS.
APPLICATION FILED DEC. 4, 1906.
941,875. Patented Nov. 30, 1909.
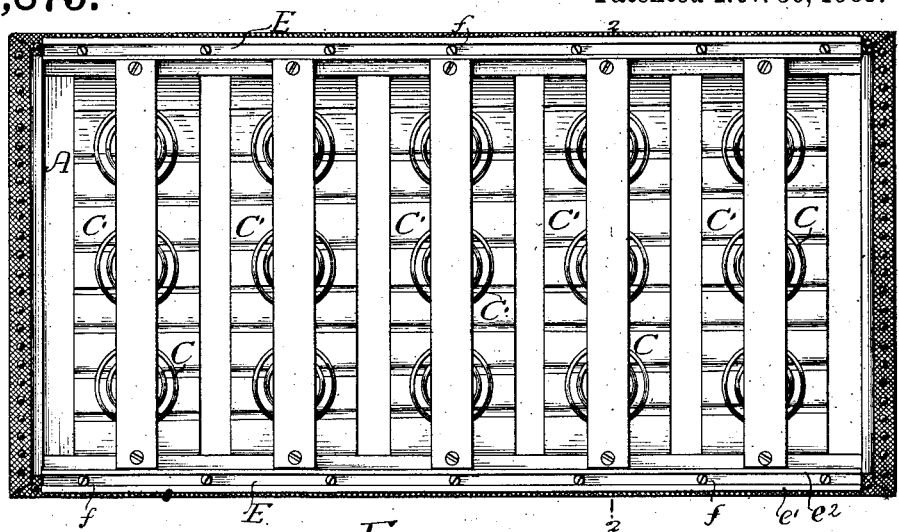
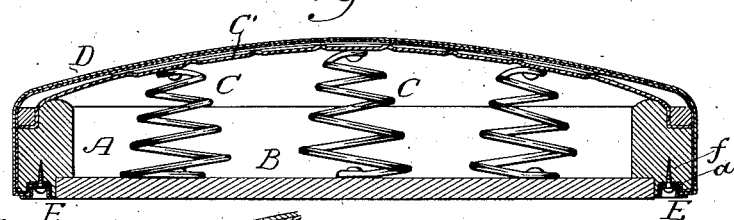
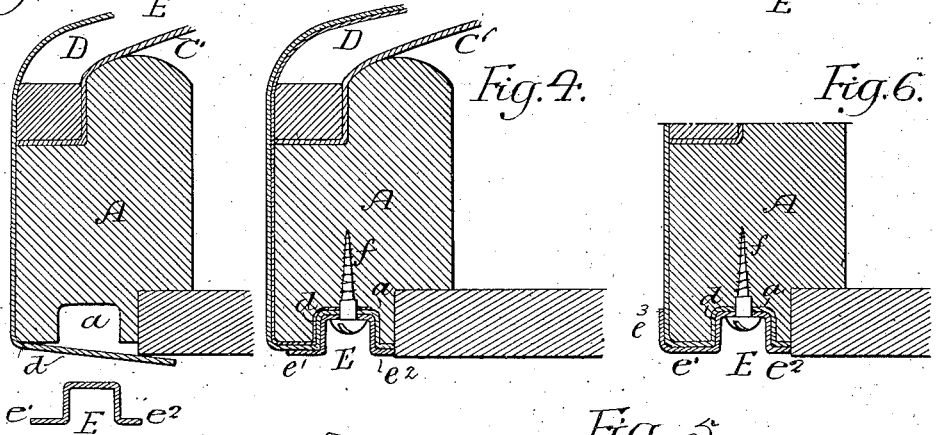
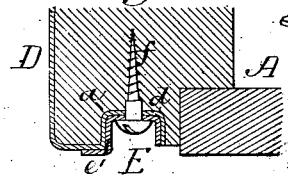
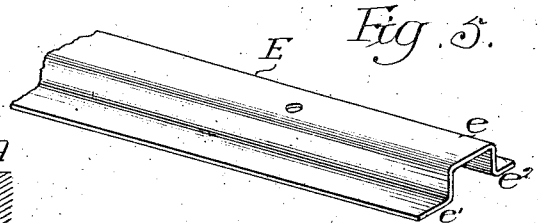
Witnesses:
Inventor:
Fred H. Henry,
by his Attorneys, ated
UNITED STATES PATENT OFFICE.

FRED H. HENRY, OF PHILADELPHIA, PENNSYLVANIA, ASSIGNOR TO JOHN A. BRILL, OF PHILADELPHIA, PENNSYLVANIA.

WEAR-STRIP AND RETAINER FOR SECURING COVERINGS TO THE FRAMES OF CAR-SEATS.

941,875. Specification of Letters Patent. Patented Nov. 30, 1909.

Application filed December 4, 1906. Serial No. 346,251.

*To all whom it may concern:*

Be it known that I, FRED H. HENRY, a citizen of the United States, residing in Philadelphia, Pennsylvania, have invented certain Improvements in Wear-Strips and Retainers for Securing Coverings to the Frames of Car-Seats, of which the following is a specification.

My invention relates to certain improvements in car seats and especially those in which the seat section is removable and which must rest upon a fixed support.

The object of my invention is to provide means for firmly securing the ratan or other covering to the seat frame so that while the covering material will be firmly attached to the seat the means will act as a wear plate for protecting the underlapping portion of the covering which is ordinarily subjected to considerable wear, owing to the rough usage to which a car seat is usually subjected.

In the accompanying drawings:—Figure 1, is an inverted plan view of a car seat illustrating my invention; Fig. 2, is a transverse sectional view on the line 2—2, Fig. 1; Fig. 3, is a sectional view showing the parts detached; Fig. 4, is an enlarged view of part of Fig. 2; Fig. 5, is a perspective view of a portion of the wear strip; Figs. 6, 7 and 8, are views of modifications of my invention.

Car seats are either covered with cloth or ratan, and ratan is extensively used for the covering of the seats of all classes of cars, excepting first class passenger coaches. Ratan is very difficult to secure properly to the seat frames owing to the fact that the edge is rough and the intermeshing strips are liable to become unraveled.

By my invention I can firmly secure the edges of the strip to the frame of the seat, the securing device also acting as a wear strip for protecting the underlapping portion of the ratan covering.

It will be understood that my invention can be used in securing the ordinary fabric covering to the seat frame without departing from the invention.

Referring to the drawing, A is the quadrangular frame of the car seat, B the spring supporting strips, C the springs, C′ the spring plates and D the fabric covering, either ratan or cloth. This covering is supported by the spring plates and extends over the edge of the frame and laps under the frame, as illustrated, and the underlapping portion is the only portion fastened to the frame A.

In order to firmly secure the covering to the frame I form a longitudinal groove $a$ (Fig. 3), in each side strip of the frame A and the underlapping portion $d$ of the covering is forced into this groove $a$ by the wear strip E, which is made in the form of a channel, as illustrated in Fig. 5, the channel portion $e$ fitting in the groove $a$ and the flanges $e'$ and $e^2$ underlapping the covering. These flanges protect the covering from wear. The strip E is secured to the frame A by means of screws or nails $f$, the channel being of such a depth that the heads of the screws or nails will not project beyond the surface of the wear strip, leaving the surface of the strip perfectly smooth. Another feature is that the strip is the only means of securing the covering to the seat frame, so that when it is necessary to replace the covering the strips can be readily removed, the covering quickly detached and a new covering substituted without the loss of time.

In Fig. 5, I have shown the flanges of the strip flat, while in Fig. 8, I have shown the flanges slightly curved in cross section, so that when the strip is placed in position the edges of the strip will be in contact with the material, making a neat fit.

In Fig. 7, I have shown a modification in which the short flange $e^2$ is dispensed with and in Fig. 6, I have shown the flange $e'$ provided with a lip $e^3$ extending over the edge of the seat so as to protect the fabric at the exposed corner. In some instances I may only extend the strip on the two sides of the car seat which are exposed to the greatest wear and secure the covering to the ends by tacks or other ordinary fastenings, but I prefer where possible to utilize the wear strip at the ends of the seats as well as at the sides.

Thus it will be seen that I can provide a very cheap and substantial means for securing the coverings of car seats, especially ratan coverings, can dispense with the use of tacks at the same time utilize the said means as a protector for the underlapping portion of the covering and so attach the means to the frame of the car seat that it can be readily removed when it is desired to replace the covering.

I claim:—

1. The combination in a car seat, of a frame having a groove in its under side, a cover underlapping the frame and extending into the groove, a metallic channel wear strip, the channel portion of the wear strip entering the groove and confining the covering to the frame, said wear strip having an extended flange on each side overlapping the covering and the frame beyond the channel, and a headed retaining means driven through the base of the channel section into the frame of the seat; substantially as described.

2. The combination in a car seat, of a frame having a groove in its underside, a covering underlapping the frame and extending into the groove, a metallic channel wear strip, the channel portion of the wear strip entering the groove and confining the covering to the frame, said strip having a flange extending to the edge of the seat, and a lip on the flange projecting upward and protecting the covering at the edge of the seat, and a headed retaining means driven through the base of the channel section, substantially as described.

In testimony whereof, I have signed my name to this specification, in the presence of two subscribing witnesses.

FRED H. HENRY.

Witnesses:
   Jos. H. Klein,
   Wm. A. Barr.